(12) United States Patent
Osawa et al.

(10) Patent No.: US 6,552,819 B2
(45) Date of Patent: *Apr. 22, 2003

(54) IMAGE PROCESSING APPARATUS AND METHOD

(75) Inventors: Hidefumi Osawa, Kawaguchi (JP); Yoshinobu Mita, Kawasaki (JP); Tadayoshi Nakayama, Tokyo (JP); Ken Onodera, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,645

(22) Filed: Apr. 9, 1997

(65) Prior Publication Data
US 2001/0040699 A1 Nov. 15, 2001

(30) Foreign Application Priority Data
Apr. 10, 1996 (JP) .............................................. 8-088316

(51) Int. Cl.[7] .............................. G06F 15/00; G06K 9/36
(52) U.S. Cl. ........................ 358/1.17; 382/239; 358/1.2
(58) Field of Search ........................ 395/114–116, 112, 395/101, 109, 110, 113, 117; 358/444, 468, 1.1–1.9, 1.11–1.18; 382/235, 232, 237, 239

(56) References Cited

U.S. PATENT DOCUMENTS

| | | | | |
|---|---|---|---|---|
| 4,712,141 A | * | 12/1987 | Tomosisa et al. | 358/280 |
| 5,500,928 A | * | 3/1996 | Cook et al. | 395/133 |
| 5,602,976 A | * | 2/1997 | Cooper et al. | 395/116 |
| 5,604,846 A | * | 2/1997 | Kadota | 358/1.16 |
| 5,768,486 A | | 6/1998 | Sugaya | 395/116 |

FOREIGN PATENT DOCUMENTS

EP 657844 * 6/1995 .......... G06K/15/00

* cited by examiner

Primary Examiner—Wenpeng Chen
(74) Attorney, Agent, or Firm—Fitzpatrick, Cella, Harper & Scinto

(57) ABSTRACT

An analyzer estimates the time for rendering image data based on the number, types, etc., of rendering commands, stored in an intermediate memory, and determines whether or not there is a possibility of overrun. If there is the possibility of overrun, image data of respective bands formed in a band buffer are sequentially compressed and stored into a compressed image memory. When the image data for one page has been stored, the data in the compressed image memory is sequentially expanded and supplied to a printer engine. This avoids failure of image output due to overrun, while reducing the capacity of the image memory.

20 Claims, 4 Drawing Sheets

IMAGE PROCESSING APPARATUS AND METHOD

BACKGROUND OF THE INVENTION

This invention relates to an image processing apparatus and method and, more particularly to an image processing apparatus and method for forming an image based on input image information.

Printers are known which perform rasterizing based on print data in Page Description Language (hereinafter referred to as "PDL data"), and supply the rasterized data to a printer engine.

These printers have the following problems:
1) To realize downsizing, cost reduction and the like of a printer controller, a printer having a small-capacity image memory (band memory) with a capacity less than the capacity for storing data for one page is provided. In this case, if the speed of rasterizing a page object is lower than the print speed of the printer engine, a print medium is discharged without forming the desired output image. This status is referred to as "overrun".
2) Also, to realize downsizing, cost reduction and the like of a printer controller, there is limitation upon the capacity of an intermediate memory for temporarily storing print data received from an external device such as a computer. In this case, all the objects for one page cannot be stored into the intermediate memory, and desired printing cannot be performed. This status is referred to as "memory overflow".

In a case where the image memory has a capacity for storing data for one page, even if all the objects for one page cannot be stored in the intermediate memory, a part of the object stored in the intermediate memory can be sequentially rasterized, then the rasterized object can be sequentially deleted from the memory, and the subsequent part of the object can be stored into the intermediate memory.

However, as this method requires an image memory for one page, it is difficult to realize downsizing, cost reduction and the like for a printer controller.

SUMMARY OF THE INVENTION

The present invention has been made in consideration of the above situation, and has its object to prevent occurrence of overrun and memory overflow while reducing the capacity of a memory resource for image processing.

According to the present invention, the foregoing object is attained by providing an image processing apparatus for generating an image based on image information, comprising: input means for inputting image information; an image information memory for temporarily storing the image information; an image memory for storing image data, having a capacity less than a capacity for storing image data for one page; rendering means for rendering image data in the image memory based on the image information stored in the image information memory; compressing means for compressing the image data in the image memory and sequentially storing the compressed image data into a compressed image memory; expanding means for expanding the compressed image data stored in the compressed image memory; and output means for outputting an image based on the image data expanded by the expanding means onto a print medium, wherein the expanding means continuously expands the compressed image data stored in the compressed image memory and supplies the expanded image data to the output means.

Preferably, in the image processing apparatus, the expanding means continuously expands the compressed image data for one page and supplies the expanded image data to the output means.

Preferably, in the image processing apparatus, after the compressed image data for one page has been stored into the compressed image memory, the expanding means continuously expands the compressed image data and supplies the expanded image data to the output means.

Preferably, the image processing apparatus further comprises analyzing means for estimating processing time for rendering by the rendering means, wherein the compressing means and the expanding means are controlled based on the processing time estimated by the analyzing means, so as to prevent overrun of the output means.

Preferably, in the image processing apparatus, if the processing time estimated by the analyzing means is less than a predetermined value, the image data generated by the rendering means is directly supplied to the output means, while if the processing time is greater than the predetermined value, the compressing means sequentially compresses the image data and stores the compressed image data into the compressed image memory, thereafter, the expanding means continuously expands the image data and supplies the expanded image data to the output means.

Preferably, in the image processing apparatus, the expanding means continuously expands the compressed image data for one page and supplies the expanded image data to the output means.

Preferably, in the image processing apparatus, after the compressed image data for one page has been stored into the compressed image memory, the expanding means continuously expands the compressed image data and supplies the expanded image data to the output means.

Preferably, the image processing apparatus further comprises available-capacity detecting means for detecting an available capacity of the image information memory, wherein the input means, the rendering means, the compressing means and the expanding means are controlled based on the available capacity detected by the available-capacity detecting means, so as to prevent overflow of the image information memory.

Preferably, in the image processing apparatus, when the available capacity of the image information memory becomes less than a predetermined amount, input of the image information by the input means is stopped, then image data is rendered in the image memory based on the image information stored in the image information memory up to that time, and the image data is compressed and stored into the compressed image memory, next, the image data for one page is formed in the compressed image memory by repeating operations of: inputting subsequent image information by the input means until it is detected that the available capacity of the image information memory is less than a predetermined amount; storing the subsequent image information into the image information memory in place of the image information used in rendering by the rendering means; specifying an image area corresponding to the subsequent image information; expanding the image data at the image area stored in the compressed image memory and re-writing the image data in the image memory, while rendering image data in the image memory based on the subsequent image information; and compressing image data obtained from combination of the image data re-written in the image memory and the image data rendered in the image memory based on the subsequent image information by the compressing means, and storing the compressed image data into the compressed image memory, and the expanding means continuously expands the image data and supplies the expanded data to the output means for one page.

Preferably, in the image processing apparatus, the image memory has at least two band memories, so that the image data is outputted from one band memory while rendered image data is stored in the other band memory, and wherein the image area corresponds to a capacity of the one band memory.

Preferably, in the image processing apparatus, the image memory has at least two band memories, so that the image data is outputted from one band memory while rendered image data is stored in the other band memory.

Preferably, the image processing apparatus further comprises analyzing means for estimating processing time for rendering by the rendering means and available-capacity detecting means for detecting an available capacity of the image information memory, wherein the input means, the rendering means, the compressing means and the expanding means are controlled based on the processing time estimated by the analyzing means and the available capacity detected by the available-capacity detecting means, so as to prevent overrun of the output means and memory overflow of the image information memory.

Preferably, in the image processing apparatus, the compressing means includes means for converting the image data supplied from the rendering means into low resolution image data.

Preferably, in the image processing apparatus, the expanding means includes means for converting low resolution image data into high resolution image data.

Preferably, the image processing apparatus further comprises data amount control means for converting image object data included in the image information inputted by the input means into low resolution data and storing the low resolution data into the image information memory.

Preferably, in the image processing apparatus, the data amount control means includes data amount predicting means for predicting a data amount of image object data to be inputted, and wherein the data amount control means converts image object data, having a data amount predicted by the data amount predicting means as greater than a predetermined amount, into low resolution data.

Preferably, in the image processing apparatus, the output means forms an output image in a print medium by an electrophotographic method.

Further, the present invention provides an image processing method for generating an image based on image information, comprising: an input step of inputting image information; a storage step of temporarily storing the image information into an image information memory; a rendering step of rendering image data in an image memory having a capacity less than a capacity for storing image data for one page, based on the image information stored in the image information memory; a compressing step of compressing the image data in the image memory and sequentially stores the compressed image data into a compressed image memory; an expanding step of expanding the compressed image data stored in the compressed image memory; and an output step of outputting an image based on the image data expanded by the expanding means onto a print medium, wherein at the expanding step, the compressed image data stored in the compressed image memory is continuously expanded and supplied to the output step.

Further objects, features and advantages of the present invention will become apparent from the following detailed description of embodiments of the present invention with reference to the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 1:
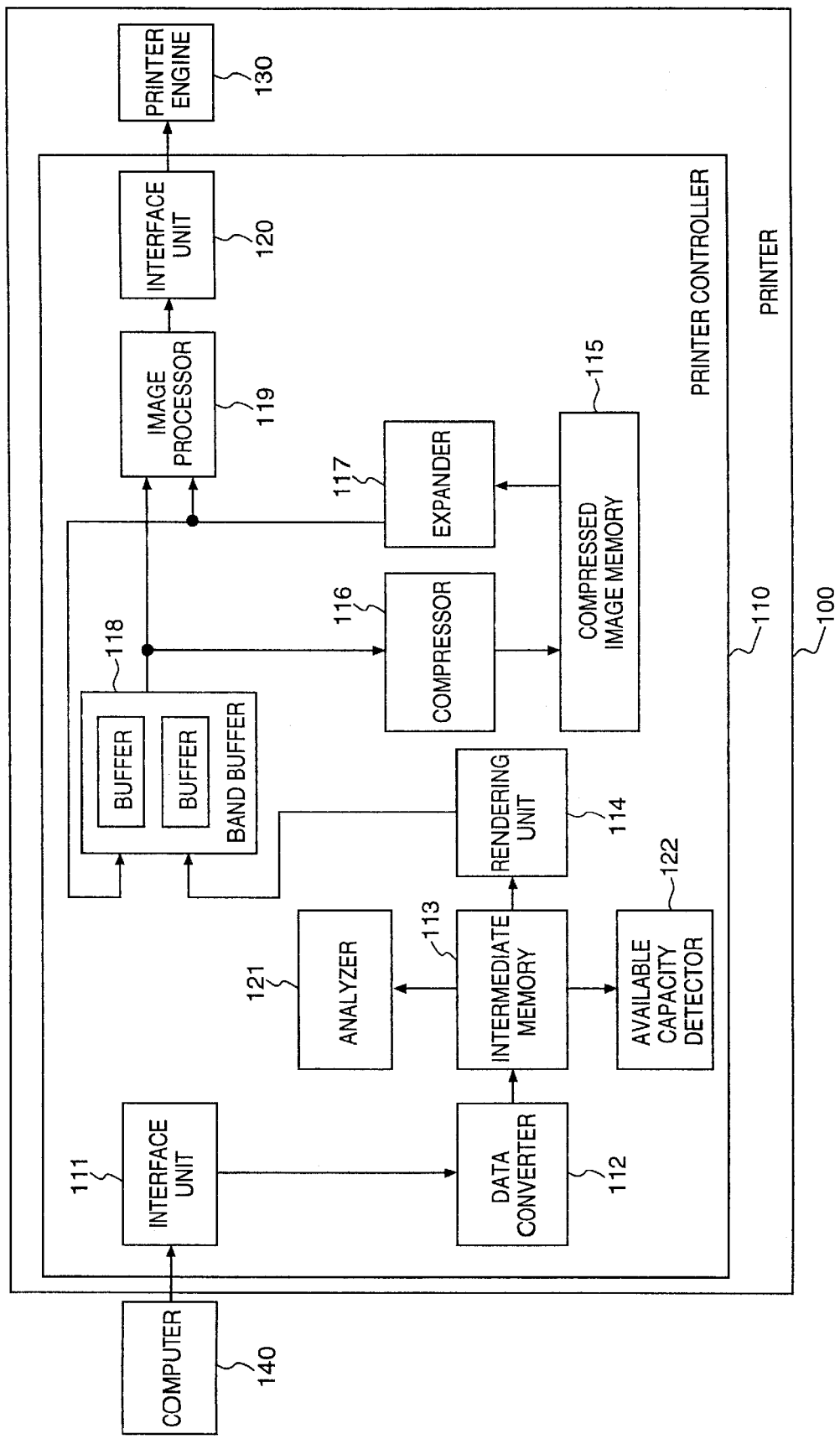
FIG. 1 is a block diagram showing the construction of a printer system according to first and second embodiments of the present invention.

FIG. 1 is a block diagram showing the construction of a printer system according to a first embodiment of the present invention. In FIG. 1, arrows represent data flow (print data, image data and the like). Control signals are not shown. A computer 140 generates print data in accordance with application software such as a document editor or figure editor, and supplies the generated print data to a printer 100. Note that the present embodiment uses PDL data as the print data.

An interface unit 111 receives the print data from the computer 140 and supplies the received print data to a data converter 112. To reduce the capacity of an image memory, the printer 100 divides one page into several bands and processes the bands. Specifically, the data converter 112 divides rendering commands included in the print data into a plurality of bands constituting one page data, and generates a display list by sorting the bands such that the bands are arranged from the page-header band to the page-bottom band. The data converter 112 stores the display list into an intermediate memory 113. Note that if print data for one page cannot be stored into the intermediate memory 113, the above processing is performed on a part of the print data.

A rendering unit 114 refers to the display list stored in the intermediate memory 113, and generates image data by rendering the image data based on rendering commands corresponding to one band, in a band buffer 118.

The band buffer 118 has two or more buffers (each functions as an image memory corresponding to one band). Preferably, while image data is rendered in one buffer, reading from another buffer is performed. The image data rendered in the band buffer 118 is directly supplied to an image processor 119 upon realtime rendering processing to be described later. The image processor 119 performs smoothing and notch-processing in the input data, and outputs the processed data to an interface unit 120. The interface unit 120 converts the input data into a video signal and supplies the signal to a printer engine 130.

The printer engine 130 forms an image in a print medium by, e.g., an electrophotographic method. Note that the present embodiment is not particularly limited to such image forming method. However, the present embodiment is particularly applicable to a printer according to a printing method which cannot suspend printing in mid-course of printing.

In the printer having a printer engine that cannot suspend printing in mid-course of printing, it is required to supply the image data to the printer engine 130 in synchronization with a video clock signal which defines the operation speed of the printer engine 130.

Next, processing for preventing overrun (overrun avoiding processing) will be described below. An analyzer 121 examines the content of the display list in the intermediate memory 113, and determines whether or not there is a possibility of overrun, based on the result of examination. For example, the analyzer 121 estimates time necessary for rendering processing (processing speed) based on the number, types etc. of the rendering commands stored in the intermediate memory 113, and compares the time with a predetermined value, to determine whether or not a realtime rendering processing should be performed. A realtime rendering processing is sequentially rendering image data in band units in the band buffer 118 and continuously transferring image data of the rendering-processed band to the image processor 119 (the transferred image data is supplied to the printer engine 130 via the inter face unit 120).

If the analyzer 121 has determined that a realtime rendering processing should not be performed, i.e., there is the possibility of overrun, the image data of the respective bands, sequentially rendered in the band buffer 118, are sequentially compressed by a compressor 116, and temporarily stored into a compressed image memory 115. Thereafter, when the amount of the image data stored in the compressed image memory 115 corresponds to one page, an expander 117 continuously expands the image data and supplies the expanded data to the image processor 119, then the image processor 119 supplies the video signals to the printer engine 130 via the interface unit 120. Note that the expansion of the image data stored in the compressed image memory 115 is not necessarily delayed until the image data for one page has been stored; the expansion of the image data in the compressed image memory 115 may be started when a predetermined amount of the image data has been stored into the compressed image memory 115 such that the video signals can be continuously supplied in correspondence with the operation speed of the printer engine 130.

Note that it is preferable that the compressing by the compressor 116 is made by a reversible compressing method, however, the present embodiment is applicable to an irreversible compressing method.

The expansion of the image data by the expander 117 is made at a speed to properly supply the video signal to the printer engine 130. This prevents the occurrence of overrun, and reduces failure of image output.

Note that in the present embodiment, so far as it is determined that there is no possibility of overrun, realtime rendering processing is performed so as to output an image at a speed as fast as possible. However, the overrun avoiding processing may always be performed to simplify the processing.

Next, processing to prevent overflow of the intermediate memory 113 (overflow avoiding processing) will be described. An available capacity detector 122 examines the available capacity of the intermediate memory 113 and determines whether or not there is a possibility of overflow. For example, if data more than a predetermined reference amount is stored into the intermediate memory 113 and no command has been received indicating the end of print data, the available capacity detector 122 determines that there is a possibility of overflow.

If it is determined that there is a possibility of overflow, reception of the print data from the computer 140 is stopped. At this time, the rendering unit 114 performs rendering based on the display list stored in the intermediate memory 113 in the band buffer 118. When the rendering has been completed, the image data rendered in the band buffer 118 is compressed by the compressor 116 and stored into the compressed image memory 115. At the same time, the used display list is deleted from the intermediate memory 113. Then the subsequent print data is received from the computer 140, and as described above, a display list of the received data is stored into the intermediate memory 113.

With respect to a rendering command of interest among the rendering commands in the newly-stored display list in the intermediate memory 113, the rendering unit 114 specifies a band corresponding to the rendering command of interest. The expander 117 reads image data corresponding to the band specified by the rendering unit 114 from the compressed image memory 115, and re-writes the data into the band buffer. Thereafter, the rendering unit 114 performs rendering over the image data (re-written image data), based on the rendering command in the intermediate memory 113, in the band buffer 118. This processing is repeated, and when the rendering of print data for one page has been completed, the expander 117 sequentially expands the compressed image data in the compressed image memory 115, supplies the expanded data to the image processor 119, which then outputs the data via the interface unit 120 to the printer engine 130. This prevents failure of image output due to overflow of the intermediate memory 113.

As described above, according to the present embodiment, if there is a possibility of overrun, the image data of respective band data, formed in the band buffer 118, are sequentially compressed and stored into the compressed image memory 115. When the formation of the image data for one page has been completed, the data stored in the compressed image memory 115 are sequentially expanded and supplied to the printer engine 130. This avoids failure of image output due to overrun while reducing the capacity of the image memory.

Further, according to the present embodiment, if there is a possibility of overflow, storing of rendering commands into the intermediate memory 113 is stopped, and rendering is performed based on rendering commands in the intermediate memory 113, in the band buffer 118. The image data of the respective bands, formed in the band buffer 118, are sequentially compressed and stored into the compressed image memory 115. Then, the used rendering commands in the intermediate memory 113 are deleted, and the rest of the rendering commands are stored into the intermediate memory 113. Image data corresponding to the newly-stored rendering commands are expanded and re-written into the band buffer 118, and rendering is performed corresponding to the new rendering commands over the re-written image data. This avoids failure of image output due to overflow of the intermediate memory 113.

[Second Embodiment]

In this embodiment, when the compressor 116 has low compressing efficiency, image data supplied from the band buffer 118 is converted into low resolution data, to decrease the number of pixels (the amount of image data to be compressed). This raises the compressing efficiency, and reduces the memory capacity necessary for the compressed image memory 115.

Figure 2:
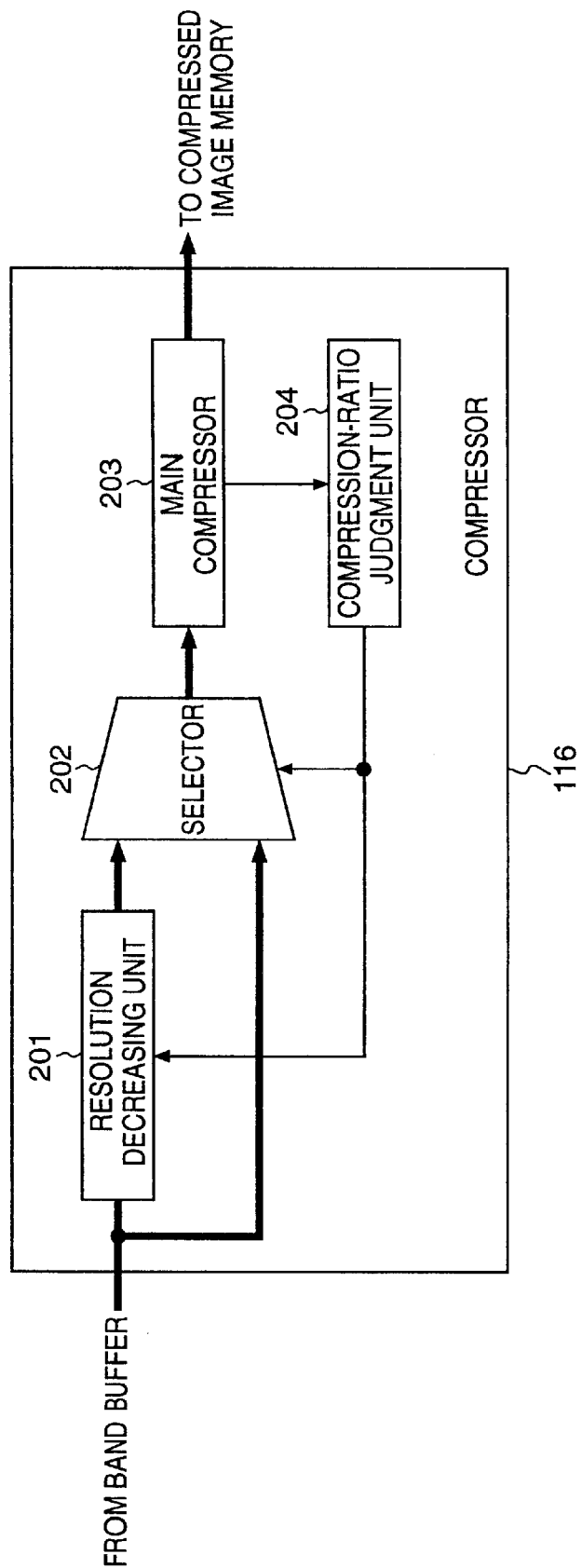
FIG. 2 is a block diagram showing the construction of a compressor according to the second embodiment.

FIG. 2 is a block diagram showing the construction of the compressor 116 according to a second embodiment. In FIG. 2, bold arrows represent data flow, and thin arrows, control signal flow. A main compressor 203 compresses image data directly supplied from the band buffer 118 or image data supplied via a resolution decreasing unit 201, and supplies the compressed image data to the compressed image memory 115. A compression-ratio judgment unit 204 judges whether or not the compressing ratio of the main compressor 203 is sufficiently high. If the compression-ratio judgment unit 204 judges that the compressing ratio is not sufficiently high, it controls the resolution decreasing unit 201 and a selector 202 such that the image data supplied from the band buffer 118 is supplied via the resolution decreasing unit 201 to the main compressor 203. This judgment is made by, e.g., comparing input data amount with output data amount or examining the available capacity of the compressed image memory 115 at appropriate intervals. The resolution decreasing unit 201 has a resolution-converting function for decreasing the number of pixels (e.g., from 600 dpi to 300 dpi) by converting the image data into low resolution data. Thus, the resolution decreasing unit 201 improves the entire compressing ratio of the compressor 116. Note that the resolution decreasing is made by a method for periodically thinning pixels from high-resolution image data or methods maintaining thin lines, e.g., a projection method.

In this manner, the entire compressing ratio of the compressor 116 can be improved by converting image data into low resolution data before compressing the image data by the main compressor 203. Accordingly, this reduces the capacity of the memory resource used as the compressed image memory 115, and allocates the surplus memory resource to the intermediate memory 113 or the like. For example, converting 600 dpi image data into 300 dpi image data reduces the number of pixels (data amount) to 1/4.

Figure 3:
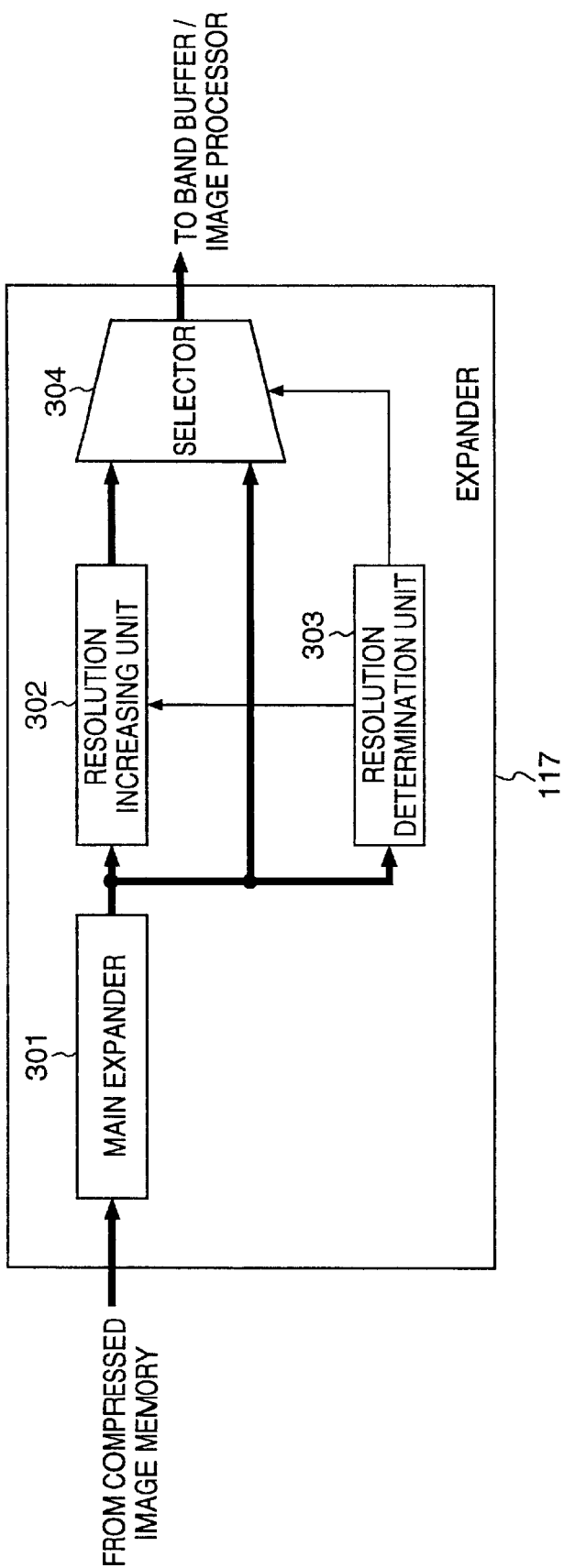
FIG. 3 is a block diagram showing the construction of an expander according to the second embodiment.

FIG. 3 is a block diagram showing the construction of the expander 117 according to the present embodiment. In FIG. 3, bold arrows represent data flow, and thin arrows, control signal flow. A main expander 301 expands the compressed image data supplied from the compressed image memory 115. A resolution determination unit 303 determines whether or not the image data expanded by the main expander 301 is the low resolution data converted by the resolution decreasing unit 201. If the data is low resolution data, a resolution increasing unit 302 converts the data into data of the initial resolution. The resolution increasing is made by, e.g., converting one pixel into a plurality of pixels (e.g., 2×2) having the initial pixel value, or expanding along with a smoothing technique. From the point of image quality of output image, it is preferable to employ the smoothing technique.

As described above, according to the present embodiment, as image data is converted into low resolution data and compressed, the entire compressing ratio of the compressor 116 can be improved, and the memory resource used as the compressed image memory 115 can be reduced. Further, by applying a smoothing technique or the like to the resolution conversion by the resolution increasing unit 302, degradation of image quality accompanying the resolution conversion can be suppressed.

[Third Embodiment]

This embodiment is based on the fact that the amount of data of image object data is greater than that of PDL data. When print data includes image object data, the data amount of the image object data is predicted, and if there is a possibility of memory overflow of the intermediate memory 113, the image object data is converted into low resolution data, thus the number of pixels (data amount) is reduced.

Figure 4:
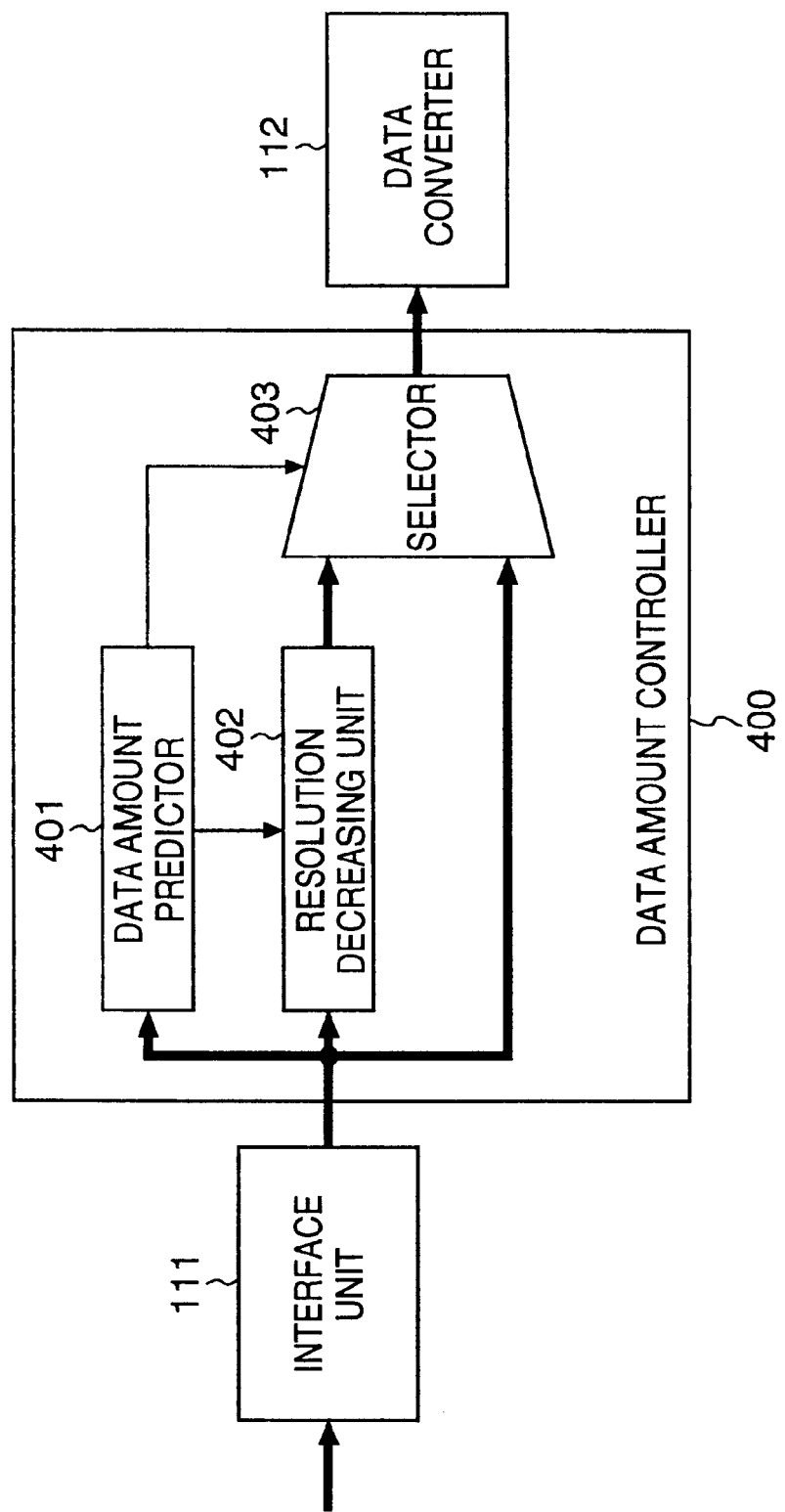
FIG. 4 is a block diagram showing the construction of a part of a printer according to a third embodiment.

FIG. 4 is a block diagram showing the construction of a part of the printer 100 according to a third embodiment of the present invention. As shown in FIG. 4, the printer 100 of the third embodiment further has a data amount controller 400 between the interface unit 111 and the data converter 112. In FIG. 4, bold arrows present data flow, thin arrows, control signal flow.

In the data amount controller 400, when print data includes image object data, a data amount predictor 401 predicts the data amount of the image object data, based on print data supplied from the interface unit 111. If the data amount is large (e.g., greater than a predetermined reference value), the data amount predictor 401 controls a resolution decreasing unit 402 and a selector 403 so as to convert the image object data to low resolution data and supply the converted data to the data converter 112.

The data amount prediction is made by simple compression method such as a Pack Bits method, by calculating the amount of coded data. If the image object data has been processed by a pseudo-halftone processing such as an error diffusion method, the data amount is particularly large. Accordingly, a binarization method performed on the image object data is determined. For example, if it is determined that the binarization method has been used to process the image object data, it can be determined that the data amount is large.

As described above, according to the present embodiment, when print data includes image object data, the amount of the image object data is predicted. If it is predicted that the amount of the image object is large, the image object data is converted to low resolution data so as to reduce the data amount. This prevents memory overflow of the intermediate memory 113.

The present invention can be applied to a system constituted by a plurality of devices or to an apparatus comprising a single device.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working in the computer performs a part or entire processes in accordance with designations of the program codes and realizes functions according to the above embodiment/embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As described above, the present invention prevents memory overflow and overrun while reducing the capacity of memory resource for image processing.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
    predicting means for predicting whether or not there is a possibility of overflow such as would preclude a capability of storing image information for one page;
    rendering means for rendering image data with a unit of band based on image information that has been stored, when said predicting means predicts that there is a possibility of overflow;
    compressing means for compressing the image data rendered by said rendering means;
    storing means for storing the image data compressed by said compressing means;
    expanding means for expanding compressed image data stored by said storing means;
    reception controlling means for deleting image information that has been used for rendering and for receiving subsequent image information;
    monitoring means for monitoring an amount of the compressed image data compressed by said compressing means;
    resolution converting means for converting a resolution of the image data rendered by said rendering means on a basis of the amount of compressed image data monitored by said monitoring means so as to reduce the amount of image data after the compressing by said compressing means; and
    output means for outputting processed image data, processed by said image processing apparatus, to a printer, wherein said output means comprises means for converting a resolution of image data expanded by said expanding means to a predetermined resolution for printing by a smoothing process to prepare the processed image data to be outputted to the printer when the expanded image data expanded by said expanding means has a low resolution due to the conversion by said resolution converting means.

2. The image processing apparatus according to claim 1, further comprising image information converting means for converting image object data, included in input image information, into compressed image object data.

3. The image processing apparatus according to claim 1, wherein said expanding means includes means for converting low resolution image data into high resolution data.

4. The image processing apparatus according to claim 1, wherein said output means continuously outputs the processed image data for one page.

5. The image processing apparatus according to claim 1, further comprising said printer, wherein said printer forms an image on a print medium by an electrophotographic method.

6. The image processing apparatus according to claim 1, wherein after the image data for one page has been compressed, said expanding means continuously expands the compressed image data.

7. The image processing apparatus according to claim 1, further comprising input means for inputting the image information.

8. The image processing apparatus according to claim 7, wherein said input means, said rendering means, said compressing means and said expanding means are controlled based on an available capacity of an image information memory for storing the image information so as to prevent overflow of said image information memory.

9. The image processing apparatus according to claim 8, wherein when the available capacity of said image information memory becomes less than a predetermined amount,
    input of the image information by said input means is stopped, then image data is rendered in said image memory by said rendering means based on the image information stored in said image information memory up to that time, and the image data is compressed,
    next, the image data for one page is formed by repeating operations of:
        inputting subsequent image information by said input means;
        storing the subsequent image information into said image information memory in place of the image information used in rendering by said rendering means;
        specifying an image area of a full page corresponding to the subsequent image information;
        expanding the compressed image data corresponding to the specified image area;
        synthesizing the expanded image data with image data based on the subsequent image information by rendering the image data in said image memory by rendering means based on the subsequent image information; and
        compressing the synthesized image data by said compressing means.

10. An image processing method comprising:
    a predicting step, of predicting whether or not there is a possibility of overflow such as would preclude a capability of storing image information for one page;
    a rendering step, of rendering image data based on image information that has been stored, when a result of said predicting step predicts that there is a possibility of overflow;
    a compressing step, of compressing the image data rendered in said rendering step;
    a storing step, of storing the image data compressed in said compressing step;
    an expanding step, of expanding compressed image data stored in said storing step;
    a reception controlling step, of deleting image information that has been used for rendering, and of receiving subsequent image information;
    a monitoring step, of monitoring an amount of compressed image data compressed in said compressing step;
    a resolution converting step, of converting the resolution of image data rendered in said rendering step on a basis of the amount of compressed image data monitored in said monitoring step so as to reduce the amount of image data after the compressing in said compressing step; and
    an output step, of outputting processed image data, processed by said image processing method, to a printer, wherein said output step comprises a step of converting a resolution of image data expanded in said expanding step to a predetermined resolution for printing by a smoothing process to prepare the processed image data to be output to the printer when the expanded image data expanded in said expanding step has a low resolution due to the conversion in said resolution converting step.

11. The image processing method according to claim 10, further comprising an image information converting step of converting image object data, included in input image information, into compressed image object data.

12. The image processing method according to claim 10, wherein said expanding step includes a step of converting low resolution image data into high resolution data.

13. The image processing method according to claim 10, wherein the processed image data for one page is continuously outputted in said output step.

14. The image processing method according to claim 10, wherein said printer forms an image on a print medium by an electrophotographic method.

15. The image processing apparatus according to claim 10, wherein after the image data for one page has been compressed, the compressed image data is continuously expanded at said expanding step.

16. The image processing apparatus according to claim 10, further comprising an input step of inputting the image information.

17. The image processing apparatus according to claim 16, wherein inputting at said input step, rendering at said rendering step, compression at said compressing step and expansion at said expanding step are controlled based on an available capacity of an image information memory for storing the image information, so as to prevent overflow of the image information memory.

18. The image processing method according to claim 17, wherein, when the available capacity of the image information memory becomes less than a predetermined amount, the input of the image information at said input step is stopped, then image data is rendered in the image memory at said rendering step based on the image information stored in the image information memory up to that time, and the image data is compressed, next, the image data for one page is formed by repeating operations of:
  inputting subsequent image information at said input step;
  storing the subsequent image information into the image information memory in place of the image information used in rendering at the rendering step;
  specifying an image area of a full page corresponding to the subsequent image information;
  expanding the compressed image data corresponding to the specified image area;
  synthesizing the expanded image data with image data based on the subsequent image information by rendering the image data in the image memory at the rendering step based on the subsequent image information; and
  compressing the synthesized image data at the compressing step.

19. An image processing apparatus, comprising:

a computer which generates image data on a page basis;

a converter which converts a given page of image data generated by said computer into a plurality of bands and generates a display list;

an intermediate memory which stores the display list of the plurality of bands comprising the given page from said converter;

a rendering unit which refers to the display list stored in said intermediate memory and generates rendering commands for rendering one band at a time;

a band buffer having an input and an output, including at least two buffers, each such buffer being adapted to store one band, wherein, when one band is read into the first input from said rendering unit and is stored in one buffer being, another band is read out from another buffer to the output, and vise versa;

an image processor having first and second inputs and an output, and which receives bands in real time at the first input from said band buffer;

a compressor for compressing bands output from said band buffer;

a compressed image memory for storing the compressed bands from said compressor;

an expander for expanding the compressed bands stored in said compressed image memory, and outputting the expanded bands to the second input of said image processor;

a capacity detector for said intermediate memory, for determining if there is a possibility of overflow based on more than a predetermined number of bands being stored in said intermediate memory prior to receiving an end of print data command from said computer for the given page, and if a determination is made that there is a possibility of overflow, reception of image data for the given page from said computer is stopped, said rendering unit completes rendering of the display list thus far stored in the intermediate memory for provision to said band buffer, with said band buffer providing the rendered bands to said compressor for compression and storage in said compressed image memory, with the thus far stored display list then being deleted from said intermediate memory, with reception of image data for the given page from said computer subsequently being resumed, with a subsequent display list for the given page being stored in said intermediate memory for subsequent rendering by said rendering unit, storage in said band buffer, compression by said compressor, and storage in said compressed image memory, wherein when the complete given page is stored, said expander expands the complete given page for provision to the second input of said image processor; and an image forming device connected to the output of said image processor for forming an image of the given page line by line in accordance with an output from said image processor.

20. The image processing apparatus of claim 19, further comprising:

a compression-ratio judgement unit for judging if a compression-ratio of said compressor is sufficiently high; and a resolution decreasing unit for decreasing a resolution of a rendered band so as to reduce an amount of data compressed by said compressor if the compression-ratio judgment means judges that the compression-ratio of said compressor is not sufficiently high.

* * * * *

UNITED STATES PATENT AND TRADEMARK OFFICE
CERTIFICATE OF CORRECTION

PATENT NO.    : 6,552,819 B2
DATED         : April 12, 2003
INVENTOR(S)   : Hidefumi Osawa et al.

It is certified that error appears in the above-identified patent and that said Letters Patent is hereby corrected as shown below:

<u>Title page,</u>
Item [56], References Cited, U.S. PATENT DOCUMENTS,
"4,712,141  12/1987 Tomosisa et al." should read -- 4,712,141  12/1987 Tomohisa et al. --.

<u>Column 12,</u>
Line 11, "being," should be deleted.

Signed and Sealed this

Fourth Day of November, 2003

JAMES E. ROGAN
*Director of the United States Patent and Trademark Office*